Feb. 8, 1966 | J. J. NEFF | 3,233,841

REEL HUB

Filed July 1, 1963 | 2 Sheets-Sheet 1

INVENTOR.
JOSEPH JOHN NEFF

BY

Christie, Parker & Hale
ATTORNEYS.

Feb. 8, 1966 J. J. NEFF 3,233,841

REEL HUB

Filed July 1, 1963 2 Sheets-Sheet 2

INVENTOR.
JOSEPH JOHN NEFF
BY
Christie, Parker & Hale
ATTORNEYS.

3,233,841
REEL HUB

Joseph J. Neff, Pasadena, Calif., assignor to Consolidated Electrodynamics Corporation, Pasadena, Calif., a corporation of California Filed July 1, 1963, Ser. No. 291,627
13 Claims. (Cl. 242—68.3)

The invention relates to reel apparatus and, more particularly, to reel hub assemblies.

The invention is primarily described herein in connection with structures and appaartus employed in the field of data processing by means of magnetic tape, although it will be understood by those skilled in the art that the applicability and utility of the invention are not so limited.

It is well known that various data or information processing, storing or recording system employ magnetic tapes which are wound on reels, and that it frequently has been found advantageous and convenient to provide these types of apparatus with hub structures for receiving these reels.

Various reel hub structures have so far been proposed and manufactured in the prevalent endeavor to construct and provide reel hubs that will measure up to the stringent requirements as to reel location, absence of wobbling, concentricity and the like, growing out of the increased tape speeds, accelerations and decelerations occurring in advanced magnetic tape data processing systems, as well as of the desire to facilitate the exchange of tape reels and to render the replacement of these reels more convenient to the operator.

The present invention provides a reel hub that is characterized by a combination of features not heretofore realized. Thus, the present invention provides a reel hub which automatically centers tape reels without the aid of centering devices that are subject to overloading or distortion during the sudden reel accelerations and decelerations occurring in advanced magnetic tape data processing systems. At the same time, the invention provides a reel hub which securely retains the reel under severest acceleration and deceleration loads. In addition, the invention provides a reel hub which limits the possibility of reel wobbling to a particularly large extent. Moreover, the invention provides a reel hub which prevents angular displacement between reel and hub in a particularly effective manner. Furthermohre, the invention provides a reel hub the mechanism of which is easily actuated without the exertion of undue force by the operator. In addition, the invention provides a reel hub that is easily mounted on and removed from the data processing apparatus.

Briefly, the reel hub according to the subject invention is adapted to removably mount and rotate a reel having an inner cylindrical retention surface. The reel hub comprises a base plate having a cylindrical peripheral surface, and movable locking members defining locking surfaces located adjacent the peripheral surface of the base plate and positioned to selectively engage said inner cylindrical surface of the reel. The reel hub according to the invention includes actuator means for actuating the locking members to a first position in which the locking surfaces are located inside the peripheral surface of the base plate and disengaged from said inner surface of the reel and for selectively releasing the locking members to a second position in which portions of the locking surfaces project beyond the peripheral surface of the base plate to engage said inner cylinddrical surface of the reel. The reel hub also includes springs for urging the locking members to their second position.

The invention and further features thereof will become readily apparent from the following detailed description of a preferred embodiment of the invention, illustrated by way of example in the accompanying drawings, in which.

Figure 1:
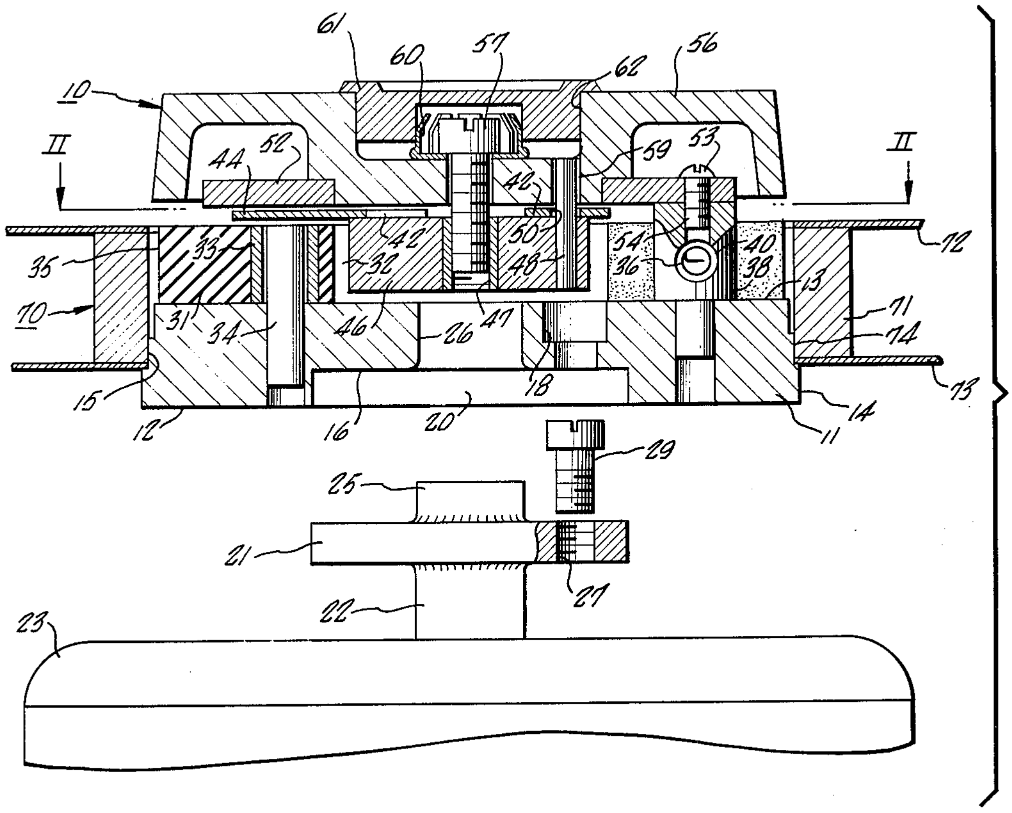
FIG. 1 is a section through a reel hub according to the invention, with associated parts.

The reel hub 10 shown in the drawings has a circular mounting or base plate 11 with a bottom surface 12 and a top surface 13. Plate 11 has a circular rim 14 at bottom surface 13 and defines a cylindrical peripheral surface 15. The plate 11 also defines a mounting surface 16 adjacent its bottom surface 12 and mounting bores 18 extending between top surface 13 and mounting surface 16. Mounting surface 16 forms part of a recess 20 adapted to receive a mounting disc 21 that is rigidly positioned on the drive shaft 22 of a reel drive 23. The reel drive 23 may be of a type well known in the art and may include a drive or servo motor (not shown). In practice, the recess 20 in base 11 is placed over mounting disc 21. The projecting end 25 of shaft 22 is received in a central bore 26 in base plate 11. The mounting disc 21 defines threaded bores 27 which correspond with the bores 18 in base plate 11. Releasable connection is established between base plate 11 and mounting disc 21 by means of mounting screws 29 inserted in mounting bores 18. In one position of the hub mechanism, the screws 29 and bores 18 are accessible from the top of the reel hub, as is apparent from FIG. 3.

Figure 2:
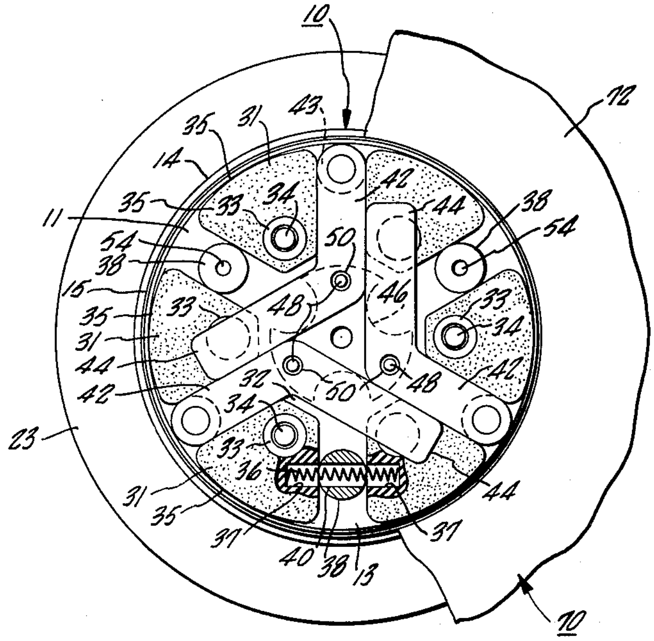
FIG. 2 is a view along line II—II in FIG. 1, with some parts broken away.
Figure 3:
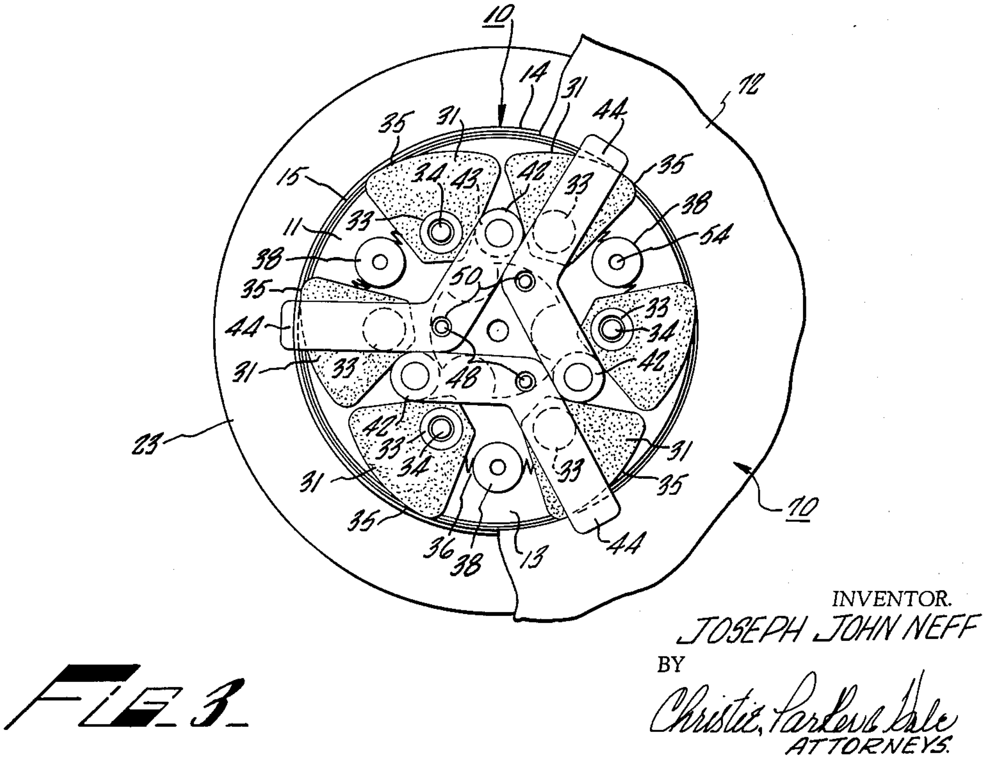
FIG. 3 is a view similar to that of FIG. 2, and shows the reel hub after actuation of certain of its parts.

A plurality of movable locking members or segments 31 are disposed on top surface 13 of base plate 11. In the embodiment shown six locking segments or three pairs of locking segments are shown. The segments 31 are located around a central region 32 adjacent top surface 13 of base plate 11 and are distributed along the circumference of peripheral surface 15. Each segment 31 has a bushing 33 and is pivoted on a pin 34 which is mounted on base plate 11. Each segment 31 also defines a locking surface 35 adjacent the peripheral surface 15. FIGS. 1 and 2 show the segments 31 in a first position in which the locking surfaces are located inside of surface 15 or, in other words, inside the circumferential region of surface 15. FIG. 3 shows the segments 31 in a second position in which portions of the locking surfaces 35 project beyond the peripheral surface 15 or beyond the circumferential region of such surface 15. The expression "circumferential region of peripheral surface 15" as used herein is means to refer to the space occupied by an imaginary circular cylinder extending through peripheral surface 15. It will be recognized that the dislocation just described of the segments 31 is due to the illustrated configuration of segments 31 and the location of their pivot axes.

The sgements 31 are biased or urged to their abovementioned second position by helical springs 36 which protrude into bores 37 provided in the segments 31. Three posts 38 are mounted on base plate 11 at the respective locations of springs 36. Each post 38 has a diametrical bore 40. One of the springs 36 extends through each bore 40 and is thus held by the particular post 38.

The hub 10 also includes a number of actuators or levers 42. In the illustrated embodiment, three levers have been shown, since the number of levers 42 corresponds to the number of locking segment pairs. It will be recognized that each pair of locking segments 42 has in fact a lever 42 associated therewith. Each lever has an actuator roller 43 mounted on one end thereof. The actuator rollers 43 have been indicated in FIGS. 2 and 3 by dotted lines and extend between the segments of the associated pair of locking segments 31. The levers 42 define reel retention fingers 44 at their opposite free ends. The levers 42 have a first position, as shown in FIG. 2, in which the actuator rollers 43 on levers 42 maintain the segments 31 in their above-mentioned first position so that the locking surfaces are located inside the peripheral surface 15, and in which the reel retention fingers 44 are also located inside of surface 15. The levers 42 also have a second position, as shown in FIG. 3, in which the actuator rollers 43 release the segments 31 and thus permit the springs 36 to move the segments to their above-mentioned second position so that portions of the locking surfaces 35 project beyond the peripheral surface 15, and in which the reel retention fingers 44 project also beyond the peripheral surface 15.

The levers 42 are actuated between their first and second positions by a substantially disc-shaped actuator drive 46 which is located in the above-mentioned center region 32. Drive disc 46 has a central threaded bore 47, and has mounted thereon a pin 48 for each lever 42. Each lever 42 has a bore 50 for receiving one of the pins 48. It will be recognized that FIG. 2 shows drive disc 46 in one position, while FIG. 3 illustrates drive disc 46 in another position which is realized by rotary movement of the drive disc 46, in the manner hereinafter to be described.

The levers 42 are maintained in place by a retainer ring 52 which is visible in FIG. 1. The retainer ring 52 extends over the posts 38 and is fastened to these posts by screws 53 which are inserted in threaded bores 54 provided in posts 38. The retainer ring 52 has not been shown in FIGS. 2 and 3 to permit a better illustration of the parts located therebelow.

The reel hub 10 also includes a circular knob structure 56 which, as seen in FIG. 1, is of smaller diameter than the peripheral surface 15. The knob structure 56 is releasably attached to drive disc 46, by means of a screw 57 extending into threaded bore 47 in drive disc 46. Knob structure 56 and screw 57 have also not been shown in FIGS. 2 and 3 to permit improved illustration of the parts below retainer ring 52. The knob structure 56 has bores 59 for receiving the pins 48 mounted on drive disc 46. In this manner, rotary movement of knob structure 56 is transmitted to drive disc 46 for the actuation of levers 42. Central screw 57 also mounts a cylindrical spring clip or button 60 which serves to retain a cover disc 61 that fits into a circular recess 62 in knob structure 56. Cover disc 61 is not an absolutely necessary part of reel hub 10, but guards the operator against contact with the screw 57 while the reel hub is in motion.

The operation of the illustrated reel hub is as follows:

First, the cover disc 61 is removed from spring clip 60 and knob structure 56. The central screw 57 is then removed from drive disc 46 and the knob structure 56 is removed from pins 48. The drive disc 46 is then floating within the central region 32 above base plate 11 and may be manually shifted to a position located between the positions shown in FIGS. 2 and 3, so that the mounting holes 18 in the base plate 11 are accessible from the top. The hub is then placed on the disc 21 on drive shaft 22 shown in FIG. 1, with the mounting holes 18 being in registry with the threaded bores 27 on disc 21. The mounting screws 29 shown in FIG. 1 are then inserted in openings 18 and bores 27, and are tightened, so that the hub is attached to disc 21 on shaft 22. The knob structure 56 is then repositioned onto the hub and the central screw 57 is relocated in threaded bore 47 of drive disc 46 and is tightened. The cover disc 61 is also repositioned into the circular recess 62 in knob structure 56 and is pressed down onto spring clip 60. A rotary twist is then applied to knob structure 56 to move the levers 42 and locking segments 31 into the position shown in FIG. 2. In this position, the locking surfaces 35 do not protrude beyond the peripheral surface 15.

A reel 70 is then placed on hub structure 10. A diametrical section through a central portion of reel 70 is shown in FIG. 1. Reel 70 comprises a central annulus 71 having a pair of sheaves 72 and 73 attached thereto. The annulus 71 and sheaves 72 and 73 may be of metal. If desired, the reel 70 may also be made of plastic material. The reel annulus 71 defines an inner cylindrical surface 74 the diameter of which corresponds to the diameter of the peripheral hub surface 15. In this manner, the reel 70 is centered with respect to drive shaft 22 the moment it is inserted on the hub 10 and the peripheral surface 15 thereof.

It will be seen from FIG. 1 that the reel 70 is inserted on hub 10 so that the sheaf 73 abuts the peripheral rim 14 on base plate 11. It will also be recognized that parts of the hub are dimensioned so that the lower surfaces of levers 42 are in a plane extending through reel sheaf 72. The knob structure 56 is then given a rotary twist so that locking segments 31 and levers 42 are moved to the position shown in FIG. 3. In this position, portions of the locking surfaces 35 of segments 31 project beyond the peripheral surface 15 on base plate 11, and engage the reel annulus 71 at its inner surface 74. In addition, the reel retention fingers 44 on levers 42 extend over the reel sheaf 72 and thus retain the reel 70 in the position shown in FIG. 1. The locking segments 31 prevent angular movement of reel 70 with respect to hub structure 10, inasmuch as these segments are shaped, pivoted and biased in such a manner that they will increase their locking effect if reel 70 should attempt an annular displacement, and will thus display a self-locking effect. Alternate ones of the locking segments 31 will prevent annular displacement of reel 70 in one direction and the remaining locking segments will prevent such annular displacement in the other direction. To promote this locking effect, the segments 31, at least at surfaces 35, are of a high-friction material, such as hard rubber.

The reel 70 may be initially empty and magnetic tape may be wound thereon during operation of drive 23. On the other hand the reel 70 may initially be provided with a supply of magnetic tape (not shown). At any rate, if it is desired to remove the reel 70 from the hub structure 10, the knob 56 is given a rotary twist so that the locking segments 31 and reel retention fingers 44 are withdrawn from the reel 70. Reel 70 may then simply be pulled off the hub, inasmuch as the diameter of the knob structure 56 is smaller than that of the inner surface 74 of reel annulus 71.

It will now be recognized that the illustrated embodiment possesses and realizes the initially mentioned features of the invention, in that the illustrated hub structure or assembly automatically centers tape reels without the aid of centering pins and limits the possibility of reel wobbling by virtue of the accurately defined peripheral hub surface 15 and rim 14. In addition, the illustrated hub also prevents angular movement between reel and hub and presents a mechanism that is conveniently actuated by the operator.

Various modifications within the scope of the invention and different uses of the invention will be apparent to those skilled in the art. For instance, the actuator rollers 43 and reel retention fingers 44 need not necessarily be associated with levers common to these parts, but may form part of individual levers as well, although the structure illustrated is believed to be particularly advantageous.

I claim:

1. A reel hub for removably mounting and rotating a reel having an inner cylindrical retention surface comprising:

(a) a base plate having a cylindrical peripheral surface;

(b) movable locking members defining locking surfaces located adjacent the peripheral surface of the base plate and positioned to selectively engage said inner cylindrical surface of the reel;

(c) actuator means for actuating the locking members to a first position in which the locking surfaces are located inside the peripheral surface of the base plate and disengaged from said inner cylindrical surface of the reel and for selectively releasing the locking members to a second position in which portions of the locking surfaces project beyond the peripheral surface of the base plate to engage said inner cylindrical surface of the reel; and (d) springs for urging the locking members to their second position.

2. A reel hub for removably mounting and rotating a reel having an inner cylindrical retention surface comprising:

(a) a base plate having a cylindrical peripheral surface;

(b) movable locking members located and pivoted on the base plate and defining locking surfaces located adjacent the peripheral surface of the base plate and positioned to selectively engage said inner cylindrical surface of the reel;

(c) actuator means for actuating the locking members to a first position in which the locking surfaces are located inside the peripheral surface of the base plate and disengaged from said inner cylindrical surface of the reel and for selectively releasing the locking members to a second position in which portions of the locking surfaces project beyond the peripheral surface of the base plate to engage said inner cylindrical surface of the reel; and (d) springs for urging the locking members to their second position.

3. A reel hub comprising:

(a) a base plate having a cylindrical peripheral surface;

(b) movable locking members located and pivoted on the base plate and defining locking surfaces adjacent the peripheral surface of the base plate;

(c) actuator means for actuating the locking members to a first position in which the locking surfaces are located inside the peripheral surface of the base plate and for selectively releasing the locking members to a second position in which portions of the locking surfaces project beyond the peripheral surface of the base plate, the actuator means comprising reel retention fingers which upon release of the locking members to the second position project beyond the peripheral surface of the base plate; and (d) springs for urging the locking members to their second position.

4. A reel hub comprising:

(a) a base plate having a bottom surface, a top surface, a circular peripheral rim adjacent the bottom surface, and a cylindrical peripheral surface between the rim and the top surface;

(b) movable locking members located on the top surface of the base plate and pivoted with respect to the base plate, the locking members defining locking surfaces adjacent the peripheral surface of the base plate;

(c) actuator means for actuating the locking members to a first position in which the locking surfaces are located inside the peripheral surface of the base plate and for selectively releasing the locking members to a second position in which portions of the locking surfaces project beyond the peripheral surface of the base plate, the actuator means comprising reel retention fingers which upon release of the locking members to the second position project beyond the peripheral surface of the base plate in a plane located above the locking members as seen from the rim of the base plate; and (d) springs for urging the locking members to their second position.

5. A reel hub comprising:

(a) a base plate having a bottom surface, a top surface, a circular peripheral rim adjacent the bottom surface, a cylindrical peripheral surface between the rim and the top surface, mounting surface adjacent the bottom surface and mounting bores extending between the top surface and the mounting surface;

(b) movable locking segments located on the top surface of the base plate and pivoted with respect to the base plate, the locking segments defining locking surfaces adjacent the peripheral surface of the base plate;

(c) actuator means for actuating the locking segments to a first position in which the locking surfaces are located inside the peripheral surface of the base plate and for selectively releasing the locking segments to a second position in which portions of the locking surfaces project beyond the peripheral surface of the base plate, actuator means comprising reel retention fingers which upon release of the locking segments to the second position project beyond the peripheral surface of the base plate in a plane located above the locking segments as seen from the rim of the base plate; and (d) springs for urging the locking segments to their second position.

6. A reel hub comprising:

(a) a base plate having a cylindrical peripheral surface;

(b) movable locking members defining locking surfaces adjacent the peripheral surface of the base plate and having a first position in which the locking surfaces are located within the circumferential region of the peripheral surface of the base place, and a second position in which portions of the locking surfaces project beyond the circumferential region of the peripheral surface of the base plate;

(c) springs for urging the locking members to their second position;

(d) actuator members having portions engaging the locking members and portions defining reel retention fingers, the actuator members having a first position in which they maintain the locking members in the first locking member position and in which the reel retention fingers are located within the circumferential region of the peripheral surface of the base plate, and a second position in which the locking members are released to their second position and in which the reel retention fingers project beyond the circumferential region of the peripheral surface of the base plate; and (e) means for reciprocally moving the actuator members between their first and second positions.

7. A reel hub comprising:

(a) a base plate having a cylindrical peripheral surface;

(b) movable locking members defining locking surfaces adjacent the peripheral surface of the base plate and having a first position in which the locking surfaces are located within the circumferential region of the peripheral surface of the base plate, and a second position in which portions of the locking surfaces project beyond the circumferential region of the peripheral surface of the base plate;

(c) springs for urging the locking members to their second position;

(d) actuator members having portions engaging the locking members and portions defining reel retention fingers, the actuator members having a first position in which they maintain the locking members in the first locking member position and in which the reel retention fingers are located within the circumferential region of the peripheral surface of the base plate, and a second position in which the locking members are released to their second position and in which the reel retention fingers project beyond the circumferential region of the peripheral surface of the base plate; and (e) manually actuable rotatable means for moving the actuator members to their first position and selectively to their second position.

8. A reel hub comprising:

(a) a base plate having a cylindrical peripheral surface;

(b) movable locking members pivotally mounted on the base plate and distributed along the peripheral surface of the base plate, the locking members defining locking surfaces adjacent the peripheral surface of the base plate and having a first position in which the locking surfaces are located within the circumferential region of the peripheral surface of the base plate, and a second position in which portions of the locking surfaces project beyond the circumferential region of the peripheral surface of the base plate;

(c) springs for urging the locking members to their second position;

(d) actuator members having portions engaging the locking members and portions defining reel retention fingers, the actuator members having a first position in which they maintain the locking members in the first locking member position and in which the reel retention fingers are located within the circumferential region of the peripheral surface of the base plate, and a second position in which the locking members are released to their second position and in which the reel retention fingers project beyond the circumferential region of the peripheral surface of the base plate; and (e) a manually actuable rotatable driver member for driving the actuator members to their first position and for selectively driving the actuator members to their second position.

9. A reel hub comprising:

(a) a mounting and base plate having a cylindrical peripheral surface;

(b) pairs of movable locking segments pivotally mounted on the base plate and distributed around a center region of the base plate and along the peripheral surface of the base plate, the locking segments defining locking surfaces adacent the peripheral surface of the base plate and having a first position in which the locking surfaces are located within the circumferential region of the peripheral surface of the base plate, and a second position in which portions of the locking surfaces project beyond the circumferential region of the peripheral surface of the base plate;

(c) springs for urging the locking segments to their second position;

(d) an actuator member for each pair of locking segments, the actuator member having a portion engaging the associated pair of locking segments and a portion defining a reel retention finger, and the actuator member having a first position in which it maintains the associated pair of locking segments in the first locking segment position and in which the reel retention finger is located within the circumferential region of the peripheral surface of the base plate, and a second position in which the associated pair of locking segments is released to the second locking member position in which the reel retention finger projects beyond the circumferential region of the peripheral surface of the base plate; and (e) a manually actuable rotatable drive member located in said center region of the base plate for driving the actuator member for each pair of locking segments to its first position and for selectively driving the actuator member for each pair of locking segments to its second position.

10. A reel hub as claimed in claim 9, including a manually actuable circular knob structure releasably connected to the rotatable driver member, the knob structure extending in a plane which is parallel to the mounting and base plate and the knob structure having a diameter which is smaller than the diameter of the cylindrical peripheral surface of the mounting and base plate.

11. A reel hub as claimed in claim 9, wherein the plate defines mounting bores in the center region thereof, and wherein the rotatable driver member defines peripheral recesses through which the regions occupied by the mounting bores are selectively accessible.

12. A reel hub assembly for removably mounting and rotating a reel having an inner cylindrical retention surface, the reel hub assembly defining a cylindrical peripheral reel centering surface and including means defining selectively movable locking surfaces adjacent the peripheral reel centering surface, said locking surfaces being positioned to selectively engage said inner cylindrical surface of the reel.

13. A reel hub assembly for removably mounting and rotating a reel having an inner cylindrical retention surface, the reel hub assembly defining a cylindrical peripheral reel centering surface and including pivoted locking segments defining selectively movable locking surfaces adjacent the peripheral reel centering surface, said locking surfaces being positioned to selectively engage said inner cylindrical surface of the reel.

References Cited by the Examiner

UNITED STATES PATENTS 3,002,706 10/1961 Flan et al. -------- 242—68.3

MERVIN STEIN, *Primary Examiner.*

RUSSELL C. MADER, *Examiner.*